US009890550B2

(12) United States Patent
Gaudet, Jr. et al.

(10) Patent No.: US 9,890,550 B2
(45) Date of Patent: *Feb. 13, 2018

(54) SYSTEMS AND METHODS FOR STORAGE

(71) Applicant: J & M Industries Inc., Ponchatoula, LA (US)

(72) Inventors: Donald J. Gaudet, Jr., Ponchatoula, LA (US); Aaron Gummer, New Orleans, LA (US)

(73) Assignee: J&M Industries, Inc., Ponchatoula, LA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/404,595

(22) Filed: Jan. 12, 2017

(65) Prior Publication Data

US 2017/0121996 A1 May 4, 2017

Related U.S. Application Data

(63) Continuation of application No. 15/138,989, filed on Apr. 26, 2016, now Pat. No. 9,574,369, which is a continuation of application No. 13/757,333, filed on Feb. 1, 2013, now Pat. No. 9,347,239.

(60) Provisional application No. 61/594,727, filed on Feb. 3, 2012.

(51) Int. Cl.
*A01F 25/13* (2006.01)
*B65G 3/02* (2006.01)
*E04H 7/22* (2006.01)
*B65C 3/02* (2006.01)

(52) U.S. Cl.
CPC ............... *E04H 7/22* (2013.01); *A01F 25/13* (2013.01); *B65C 3/02* (2013.01); *E04H 2007/225* (2013.01)

(58) Field of Classification Search
CPC .......... A01F 25/13; B60P 7/0876; B60P 7/06; B65G 3/02; B65G 3/00; E04H 7/22; E04H 2007/225
See application file for complete search history.

(56) References Cited

U.S. PATENT DOCUMENTS

| 2,730,150 A | 1/1956 | Wunderwald |
| 3,162,920 A | 12/1964 | Durham |
| 3,715,843 A | 2/1973 | Ballinger |

(Continued)

FOREIGN PATENT DOCUMENTS

| WO | WO2011087853 A2 | 7/2011 |
| WO | WO2012006673 A1 | 1/2012 |

OTHER PUBLICATIONS

Equid, "Grain Covering Beyond 2010" CEED Seminar Proceedings 2011, Australia.

(Continued)

*Primary Examiner* — Andrew J Triggs
(74) *Attorney, Agent, or Firm* — Rafael Perez-Pineiro, Esq.; Richard Guerra, Esq.; The Brickell IP Group PLLC

(57) ABSTRACT

In accordance with one embodiment, a system for storing commodities is provided. The system may include a tarpaulin. The tarpaulin may further have an internal strapping. In accordance with one embodiment, a method for storing commodities is provided. The method may include providing a tarpaulin. In one embodiment, the method for storing commodities may include configuring the tarpaulin to provide internal strapping.

12 Claims, 11 Drawing Sheets

(56) References Cited

U.S. PATENT DOCUMENTS

| | | | |
|---|---|---|---|
| 3,949,527 A * | 4/1976 | Double | B65D 90/00 150/154 |
| 3,991,900 A | 11/1976 | Burke et al. | |
| 4,084,358 A * | 4/1978 | Winters | E04H 7/24 52/222 |
| 4,224,770 A * | 9/1980 | Petty | A01F 25/13 52/169.6 |
| 4,364,205 A | 12/1982 | Scott | |
| 4,413,029 A * | 11/1983 | Handwerker | A01F 25/13 428/102 |
| 4,455,790 A * | 6/1984 | Curle | A01F 25/13 52/4 |
| 4,493,248 A * | 1/1985 | Wolstenholme | B65G 3/02 366/101 |
| 4,502,369 A | 3/1985 | Aldag | |
| 4,505,512 A | 3/1985 | Schmeichel | |
| 4,590,715 A | 5/1986 | Pandell | |
| 4,627,333 A | 12/1986 | Anderson | |
| 4,887,400 A | 12/1989 | Carroll | |
| 4,897,970 A * | 2/1990 | Double | A01F 25/13 52/3 |
| 5,050,924 A * | 9/1991 | Hansen | B60P 7/0876 296/100.15 |
| 5,240,756 A | 8/1993 | Finell et al. | |
| 5,291,698 A | 3/1994 | Rayner, Jr. | |
| 5,363,605 A * | 11/1994 | Handwerker | B65G 3/02 52/3 |
| 5,427,491 A | 6/1995 | Duffy et al. | |
| 5,791,090 A | 8/1998 | Gitlin et al. | |
| 6,003,929 A | 12/1999 | Birdsell | |
| 6,474,022 B1 | 11/2002 | Double et al. | |
| 6,865,852 B2 | 3/2005 | Gower | |
| 7,430,834 B2 | 10/2008 | Degarie | |
| 7,578,100 B2 | 8/2009 | Sicurella | |
| 7,600,347 B2 | 10/2009 | Lindstrom | |
| 7,686,094 B2 | 3/2010 | Kleff | |
| 7,832,149 B2 * | 11/2010 | Ligas, Jr. | E04H 9/06 135/119 |
| 7,891,140 B1 * | 2/2011 | Ligas, Jr. | E04H 9/06 135/119 |
| 8,277,156 B2 * | 10/2012 | Kinley | B60P 7/0876 410/118 |
| 8,439,422 B2 * | 5/2013 | Ricks, Jr. | B60P 7/0876 296/98 |
| 9,347,239 B2 * | 5/2016 | Gaudet, Jr. | B65G 3/02 |
| 2002/0073629 A1 | 6/2002 | Finell | |
| 2002/0166289 A1 | 11/2002 | Oviedo-Reyes | |
| 2003/0070365 A1 | 4/2003 | Martin | |
| 2006/0273615 A1 | 12/2006 | Ricks, Jr. | |
| 2007/0266644 A1 | 11/2007 | Weicht | |
| 2010/0239827 A1 | 9/2010 | Shook | |
| 2012/0317781 A1 | 12/2012 | Slutz | |
| 2013/0199589 A1 * | 8/2013 | Gaudet, Jr. | B65G 3/02 135/87 |
| 2016/0235009 A1 * | 8/2016 | Gaudet, Jr. | B65G 3/02 |
| 2016/0237710 A1 * | 8/2016 | Gaudet, Jr. | B65G 3/02 |

OTHER PUBLICATIONS

Raven Industries, Inc., "Defendant's Invalidity Contentions", *J&M Industries, Inc.* v. *Raven Industries, Inc.*, Case No. 2:16-cv-2723-JTM-KGG, U.S. District Court for the District of Kansas, May 23, 2017.

Raven Industries, Inc., "Raven Industries' Answer and Affirmative Defenses", *J&M Industries, Inc.* v. *Raven Industries, Inc.*, Case No. 2:16-cv-2723-JTM-KGG, U.S. District Court for the District of Kansas, Jan. 17, 2017.

International Bureau of WIPO, "International Preliminary Report on Patentability" issued in International Application No. PCT/US2013/024435 dated Aug. 5, 2014.

International Bureau of WIPO, "International Search Report" issued in International Application No. PCT/US2013/024435 dated Jun. 21, 2013.

International Bureau of WIPO, "Written Opinion" issued in International Application No. PCT/US2013/024435, dated Jun. 21, 2013.

\* cited by examiner

SYSTEMS AND METHODS FOR STORAGE

CROSS REFERENCE TO RELATED APPLICATIONS

This application is a continuation of U.S. application Ser. No. 15/138,989, filed Apr. 26, 2016. U.S. application Ser. No. 15/138,989 is a continuation of U.S. application Ser. No. 13/757,333 filed Feb. 1, 2013, now U.S. Pat. No. 9,347,239, issued May 24, 2016. U.S. application Ser. No. 13/757,333 claims the benefit of U.S. Patent Application No. 61/594,727 filed Feb. 3, 2012. The disclosures of which are hereby incorporated herein by reference in their entirety.

BACKGROUND OF THE INVENTION

Embodiments of the present invention generally relate to storage covers, and more particularly to tarp covers.

Various types of protective covers have been developed for covering piles or mounds of particulate material, such as salt, sand, grain and the like, from the effects of the weather while the material is in outside storage.

While prior art covers are capable of protecting a pile or mound of materials covered thereby, they possess a number of shortcomings. For example, in order to counteract the effects of aerodynamic lift exerted on such cover by the wind, a large number of ballast weights, such as automobile tires, were attached to the cover at fixed attachment points so that the ballast weights rested on the cover between the top or apex and the lower margin of the pile. However, if the pile had an atypical size or shape, the height of the pile diminished, or as particulate matter was removed from the pile, the fixed attachment points ended up so close to the ground that the ballast weights rested on the ground which reduced or eliminated the effectiveness of the weights in maintaining the cover on the pile.

The wind may also enter beneath the cover through a removal opening or otherwise get beneath the cover and exert tensile forces on the cover. In addition, the canvas material would develop rips if the stress became too great. However, once a canvas panel formed a rip, the rip had a tendency to propagate and extend the entire length of the panel, resulting in a substantial cost to repair the rip. Such ripping may also occur in vinyl or polyethylene panels of a cover under certain stress conditions.

Bulk storage pile covers have been in use for a long time. However there are some problems holding the covers down. The covers attach around the perimeter and in some cases also attach in the center. The cover is then held down by vacuum fans. Relying on vacuum fan to hold down the covers leaves them vulnerable to power outages. Any interruption in electrical service leaves the cover subject to damage, although some users have backup generators and others have tried external strapping systems. When used, external strapping systems are installed after the piles are full. However, new worker safety regulations on the use of fall protection, limits the use of external strapping systems.

Thus, there is a need for a cover for a pile of particulate material which protects the pile from the elements and resists the effects of wind and rain on the cover. A related need is for a cover which allows for the attachment of ballast weights at desired locations on the cover and also allows for each ballast attachment point to be shifted, compensating for changes in the shape and height of the pile.

There is a further need for a cover for a pile of particulate material which prevents rips which may form in the panels compromising the cover from propagating for more than a desired short length that is easy to repair.

SUMMARY OF THE INVENTION

The following presents a simplified summary of the invention in order to provide a basic understanding of some aspects of the invention. This summary is not an extensive overview of the invention. Rather than specifically identify key or critical elements of the invention or to delineate the scope of the invention, its purpose, inter alia, is to present some concepts of the invention in a simplified form as a prelude to the more detailed description that is presented later.

In accordance with one embodiment, a system for storing commodities is provided. The system may include a tarpaulin. The tarpaulin may further have an internal strapping.

In accordance with one embodiment, a method for storing commodities is provided. The method may include providing a tarpaulin. In one embodiment, the method for storing commodities may include configuring the tarpaulin to provide internal strapping. In accordance with another embodiment, a method of securing a tarpaulin and maintaining a weather resistant cover is provided.

While the subject matter disclosed herein was designed for bulk grain piles, the system for storing commodities may be used for any bulk storage of commodities. The system provides storage for commodities in moisture resistant ways. For example, the tarpaulin may be used to keep the rain off of a stored commodity.

Optionally, the system for storage may be used to store salt, compost, silage, contaminated soil and the like. In an alternate embodiment, the storage system may be used for storage tank covers such as water tanks. Optionally, the storage system may be used for providing partitioning or compartments inside a storage tank.

In yet another embodiment of the subject matter disclosed herein the system may be used for temporary work enclosures. Optionally, the system for storage may be used in any other scenario where a tarpaulin with weather resistant material may be used. The system disclosed herein may employ a plurality of tarpaulin designs. For example, the tarpaulin may be round, square, rectangular oval, kidney bean shaped and the like, or may be adaptable to any suitable shape, depending upon other factors, such as the shape of the storage area, type of particulate material being protected, local terrain, incidence of inclement weather, susceptibility to wild animal foraging, and the like. In addition, the tarpaulin may be in the form of sections that will be assembled to create an entire cover.

The storage system may allow the storage area to be filled without the need for end-user workers to get on the storage area surface after the tarpaulin is raised and the ground pile is filled. The workers may be required to get on the tarpaulin where an external strapping system or other ballast may be employed. Thereby, the subject matter disclosed herein may eliminate the risk of workers falling off the pile. In yet another embodiment, the system may be manufactured using weather resistance material.

The internal strapping system may eliminate the need for a worker to climb on top of the pile as the pile is filling or after filling is complete. In one embodiment, the subject matter disclosed herein may include webbing. For example, the webbing may be part of the tarpaulin material. In an alternate embodiment, a plurality of webbing straps may be provided.

In a preferred embodiment, the system is used in connection with a ground surface that is surrounded by a retaining wall. In one embodiment, the wall is between 6' and 8' in height, although in other embodiments the wall may be higher or lower, depending upon the size, shape, and type of particulate to be stored. The wall may be fabricated of steel, concrete, wood, or any other suitable material that will contain the particulate and withstand the outward pressure of the contents when the storage area is full. The retaining wall may be tilted outwardly at the top edge such that the perimeter of the top edge of the retaining wall is larger than the perimeter of the bottom edge of the retaining wall to form a frustoconical structure, and may also have supporting angle iron braces drilled and ratchet mounted to the exterior wall (or any other anchoring source that may be available), that bolster the wall from further tilting under the internal pressure generated by the stored particulate. In a preferred embodiment, the top of the retaining wall may be tilted outwardly at an angle of about 30°.

In other embodiments, the storage system may be used without a retaining wall. In this case, the tarpaulin may be secured to anchors embedded in the ground. If the storage area includes a flat surface of concrete or other man-made substance, anchors may be embedded in or otherwise securely attached to the substance so that the tarpaulin may be tightened or released as required to permit loading, unloading, and storage.

In a preferred embodiment of the system, the straps may be connected to a tensioning device at both the first end and the second end. In this embodiment, the straps are anchored to a winch or similar tension ratcheting device which is attached to an angle iron brace. Alternatively, the straps may be directly anchored to a winching system that is situated on the ground or may simply be anchored to a grounded stake or similar device whereby the straps can be tightened or loosened as desired.

The strap system may assist in keeping the tarpaulin in place with respect to the outer walls in the event of high winds and/or loss of power to aeration fans. The strap system may further allow keeping the tarp in place in relation to the outer walls while the reverse suction of an aeration fan may be turned off during fumigation process. The subject matter disclosed herein may allow holding the tarp in place if the aeration fans are turned off or should lose electricity from a power grid.

Depending upon the terrain, the type of particulate to be stored, and other related factors, the storage area may be circular or oval in shape. Although other shapes are possible, the preferred embodiments use tarpaulins that are round or oval largely because those shapes permit the most efficient use of the strapping system used with the invention.

In a preferred embodiment, the tarpaulin will be provided in sections that will be assembled and tensioned in accordance with the invention. The assembled tarpaulin is attached to the wall around the circumference of the storage area. In a preferred embodiment, the edges of the tarpaulin will be sandwiched between two wooden beams, one of which is mounted and secured to the top of the wall below the tarpaulin, and the second wood beam being above the tarpaulin and attached to the first with a tightening mechanism. The edges of the tarpaulin are placed between the two wooden beams which are then tightened together to hold the tarpaulin securely.

The tarpaulin sections are constructed with tunnel-like pockets running lengthwise or crosswise through the tarpaulin. A securing strap is passed through each pocket, and generally extends outwardly from the edges of the tarpaulin. Where two tarpaulin sections meet, the straps are connected using a connector such as a carabiner, ring, or if the strap ends have grommets, they could be connected using a plastic tie wrap, a bolt, cable, padlock, other any other strong connector. In some embodiments, the straps may be tied securely to one another. Where the strap extends from a tarpaulin edge at the retaining wall, it may be secured to an external point beside the tarpaulin where it can be anchored or otherwise securely affixed to a non-movable point. In a preferred embodiment, a winch may be attached to one of the angle iron braces, and will receive the end of the strap in a manner that permits the strap to be tensioned by a ratchet. When the storage area is filled, the straps may be ratcheted or otherwise tensioned so as to hold the tarpaulin tightly against the material being stored. Handles attached to the underside of the tarpaulin may allow grab points for workers to pull sections together on while deploying the storage system.

The tarpaulin sections may be configured for simple attachment to one another using plastic tie-wraps or similar closing mechanism passed through grommets in the tarpaulin. Alternatively, sections may be attached using clips, wires, laces, hook and loop fasteners, bolts, or any other equivalent fastening mechanism. A rain flap may extend over the seam between two sections, and the flap may be secured using snaps or a hook and loop or other suitable fastener. Handles may be provided on the interior surface of the tarpaulin to allow workers assembling the sections to have a better grip and apply leverage when pulling two seams sections together to form a seam. Once the tarpaulin sections have been assembled, the resulting tarpaulin may be used to cover grain or any other suitable particulate material, and may be tightened with winches and ratchets to hold the tarpaulin against the material being stored.

In the prior art, vacuum fans have been situated so as to suck air from within the tarpaulin-enclosed storage area serve to further tighten the tarpaulin against the storage material, and help to prevent the tarpaulin from flapping when blown by wind outside the tarpaulin. However, in the event of power failures, which common experience dictates occur most frequently during storms that generate high winds, the vacuum fans fail, thereby exacerbating the conditions which cause the tarpaulin to flap. In higher force winds, the flapping can cause the tarpaulin to rip or fail, and the contents of the storage area to be destroyed or disbursed by the high winds. Although the invention contemplates the use of vacuum fans to enhance the effects of straps and the perimeter attachment system, the invention represents an improvement over the prior art since the tarpaulin of the invention will provide adequate storage and protection from wind and rain even in the absence of electricity to power the vacuum fans.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following description of the invention when considered in conjunction with the drawings.

BRIEF DESCRIPTION OF THE DRAWINGS

The drawings, in which like numerals represent similar parts, illustrate generally, by way of example, but not by way of limitation, various embodiments discussed in the present document.

FIG. 2a is a detailed diagram of the edge of the tarpaulin of FIG. 1, showing the strapping within a pocket of the tarpaulin.

DETAILED DESCRIPTION OF THE PREFERRED EMBODIMENTS

Figure 1:
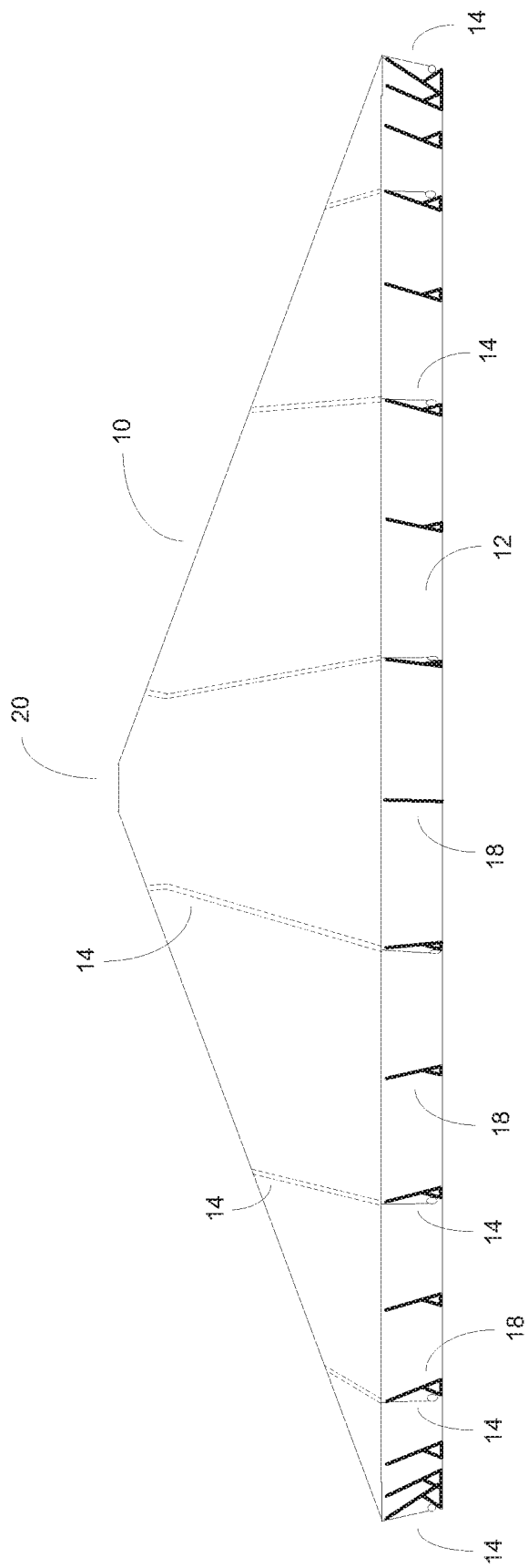
FIG. 1 is a front view of an embodiment of a storage tarpaulin and retaining wall with angle iron braces.

FIG. 1 is a front view of a storage surface area having a perimeter with a tarpaulin 10 secured to a retaining wall 12 extending around the perimeter of the storage surface area. Straps 14 extend through internal tunnels or pockets (not visible) integral to the tarpaulin. Angle iron braces 18 extend around the outside perimeter of the retaining wall 12. A top opening 20 allows particulate, preferably grain, to be loaded to the storage area using an overhead conveyor (not shown). In FIG. 1, straps are passed generally across the tarpaulin from one side to another and are secured on either side of the storage area. Internal straps 14 are encased in lengthwise pockets that are integral to the tarpaulin, and may be secured to an external anchor where they extend through the tarpaulin. The straps can be made from any suitable material, including but not limited to rope, cord, webbing or cable.

In the invention, straps are placed under tension to provide a generally downwardly directed force to secure the tarpaulin and the underlying particulate material being stored against undesired movement during the period of storage. Pockets are provided to hold the straps in place with respect to the tarpaulin, and the pockets do not experience tension along the length of the pocket.

In a preferred embodiment, the plurality of pockets and straps extending in a generally parallel direction may be spaced apart by between about 3 feet up to about 24 feet. Alternate embodiments may have variable spacing between adjacent straps and pockets.

Figure 2:
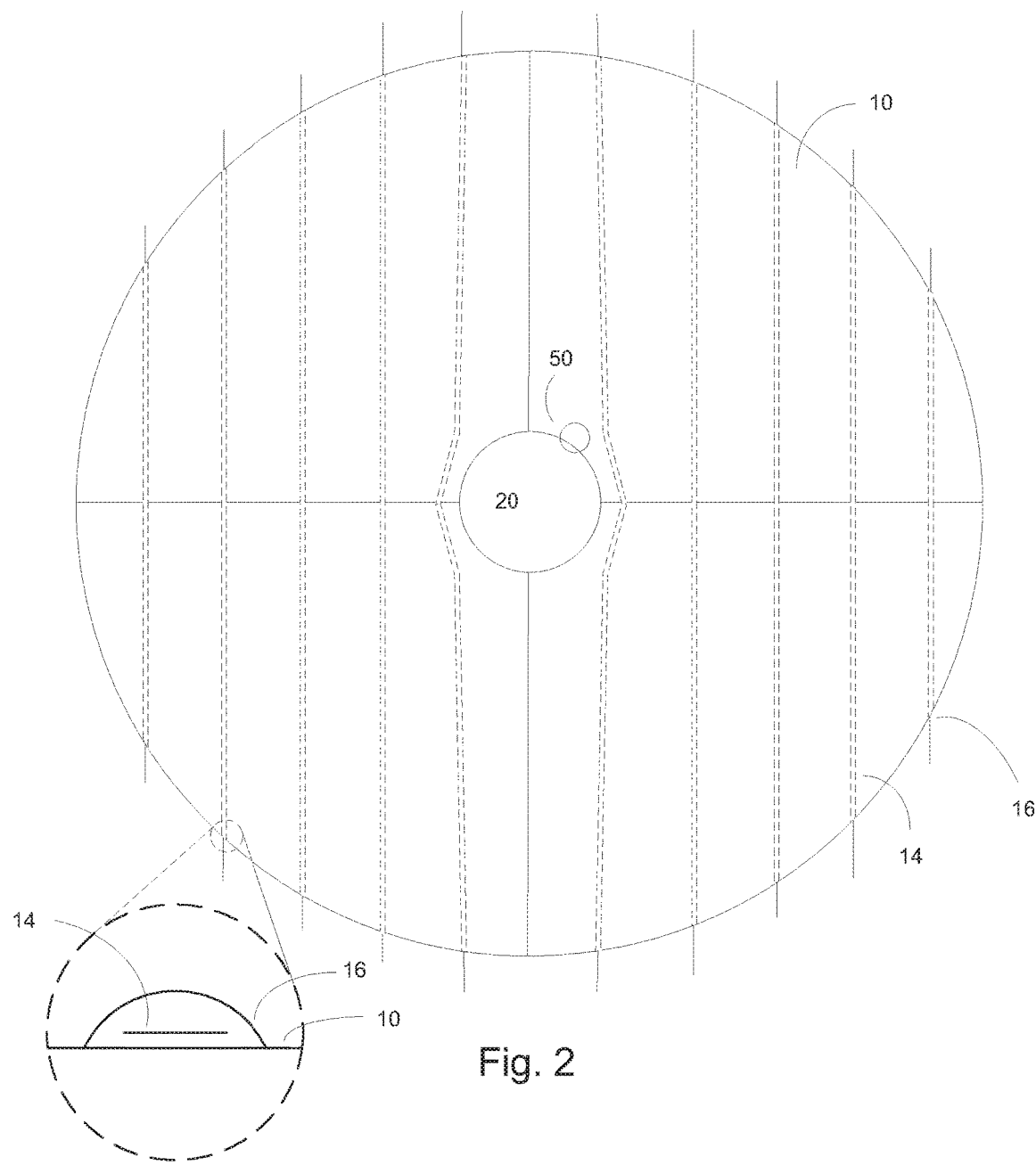
FIG. 2 illustrates a plan view of an embodiment of a tarpaulin as depicted in FIG. 1.

FIG. 2 is a plan view of a round tarpaulin 10 in which parallel pockets 16 and straps 14 extend across the tarpaulin. One or more lifting rings 50 may be attached at or near the top of the tarpaulin to assist in installation and removal. A center opening 20 is used for filling the storage area. The tarpaulin depicted in FIG. 2 may be comprised of a plurality of sections which can be adjoined together to create a larger surface area.

FIG. 2a depicts the detail of the tarpaulin 10 and pocket 16 through which a strap 14 is passed. Pockets may be used wherever it is necessary to secure a strap such that the strap must physically pass from within a pocket to the outside of the tarpaulin where it may be fastened to some other object. FIG. 2a is an enlarged, detailed view showing the structure of the tarpaulin 10 in the vicinity of straps 14, which, in a preferred embodiment, may be enclosed in pockets 16. The straps may of any material, including rope, cord, webbing, or cable. In a preferred embodiment, the straps 14 may be between 1 and 3 inches in width. In some embodiments, the straps 14 may be fully movable longitudinally within the pocket 16. In some embodiments, the pockets 16 may be thermally bonded to the tarpaulin 10. Optionally, any other suitable method such as stitching or adhesive may be used to bond the pockets to the tarpaulin. It should be noted that the word "tarp" and "tarpaulin" may be used interchangeably.

Figure 3:
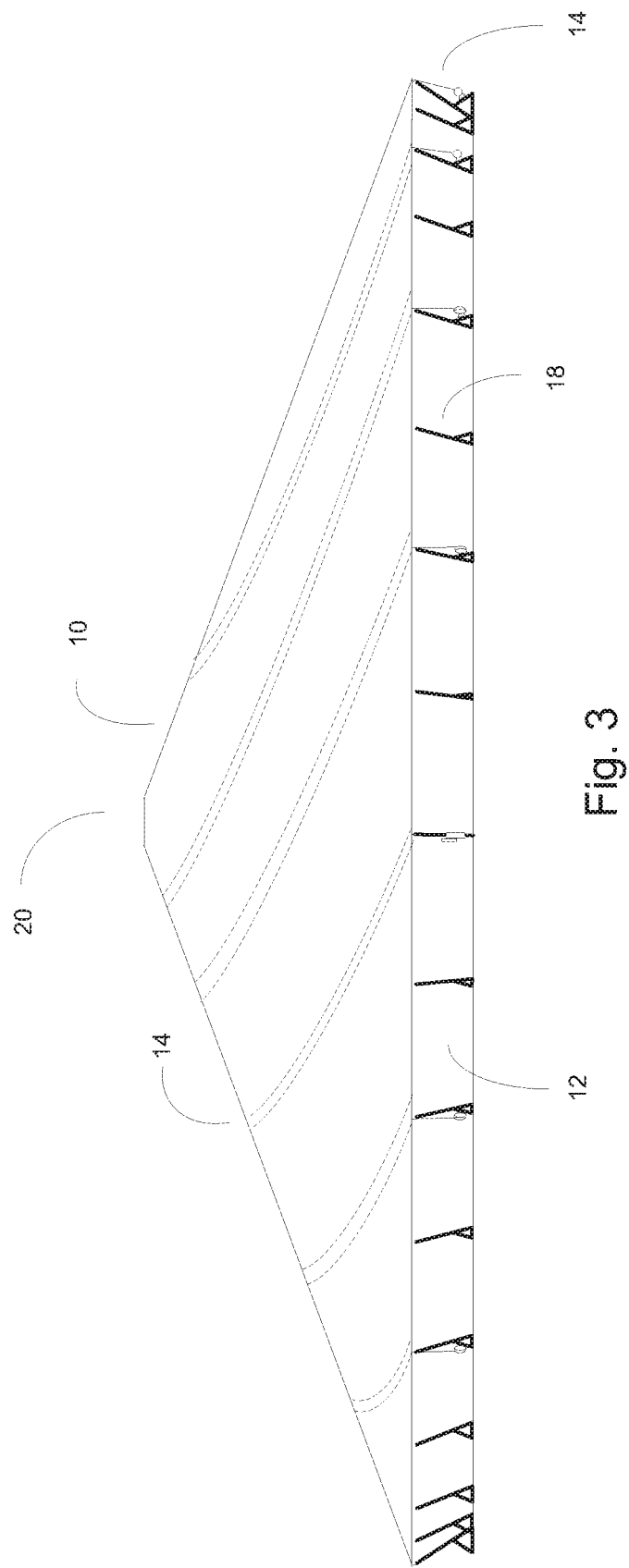
FIG. 3 is a front view of an alternative embodiment of a storage tarpaulin and retaining wall with angle iron braces.

FIG. 3 depicts another embodiment of the storage system in which straps 14 within a tarpaulin 10 run at an angle before passing over the top of the storage area. In the configuration shown in FIG. 3, additional strength is provided on one side of the storage area by the higher incidence of straps on one side.

Figure 4:
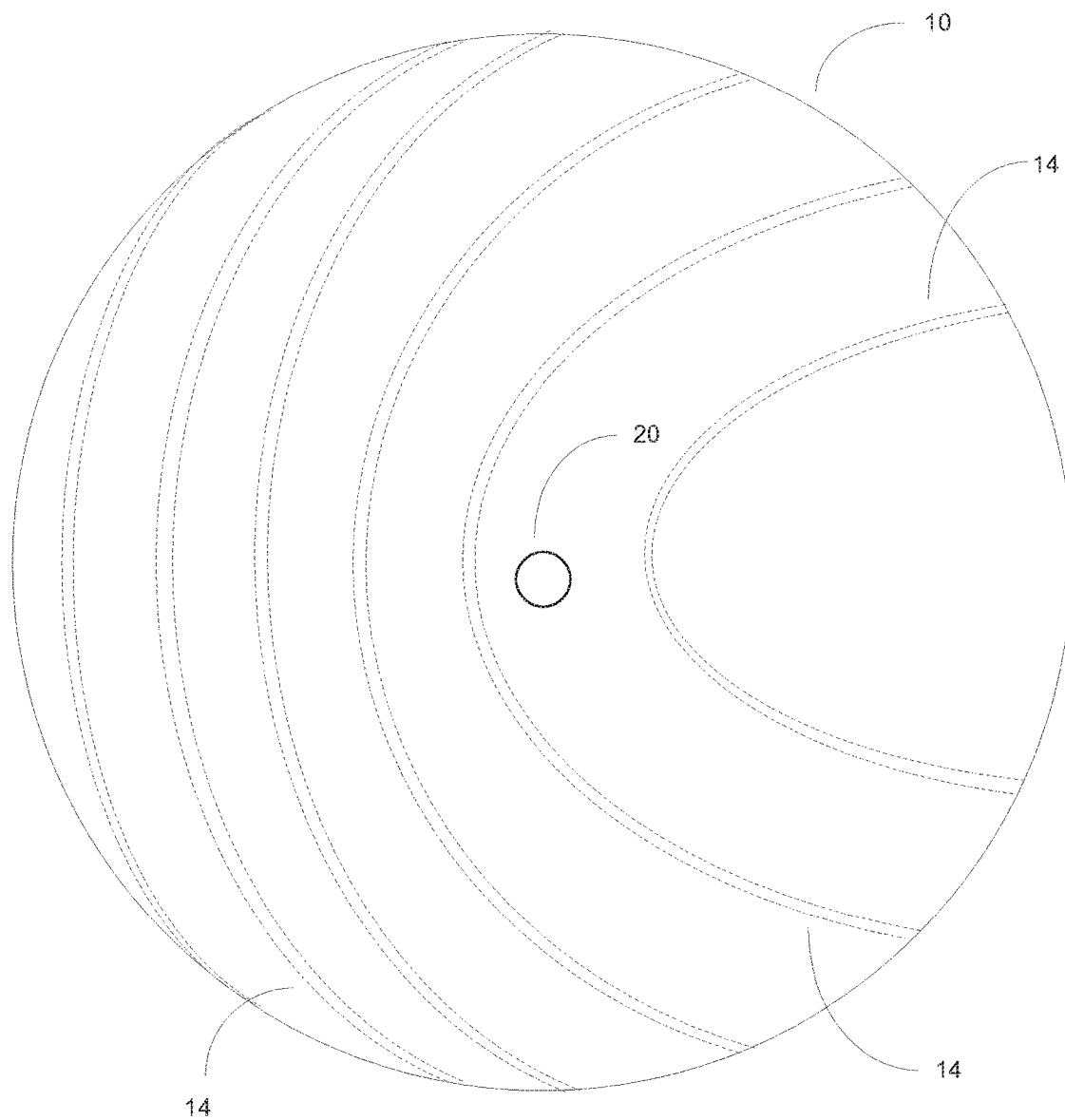
FIG. 4 illustrates a plan view of an embodiment of a tarpaulin as depicted in FIG. 3.

FIG. 4 is a plan view of the storage system of FIG. 3. Straps 14 generally provide support in a localized section of the tarpaulin. Such localized support might be desirable in situations in which there is a prevailing wind that constantly wears against one side of the tarpaulin.

Figure 5:
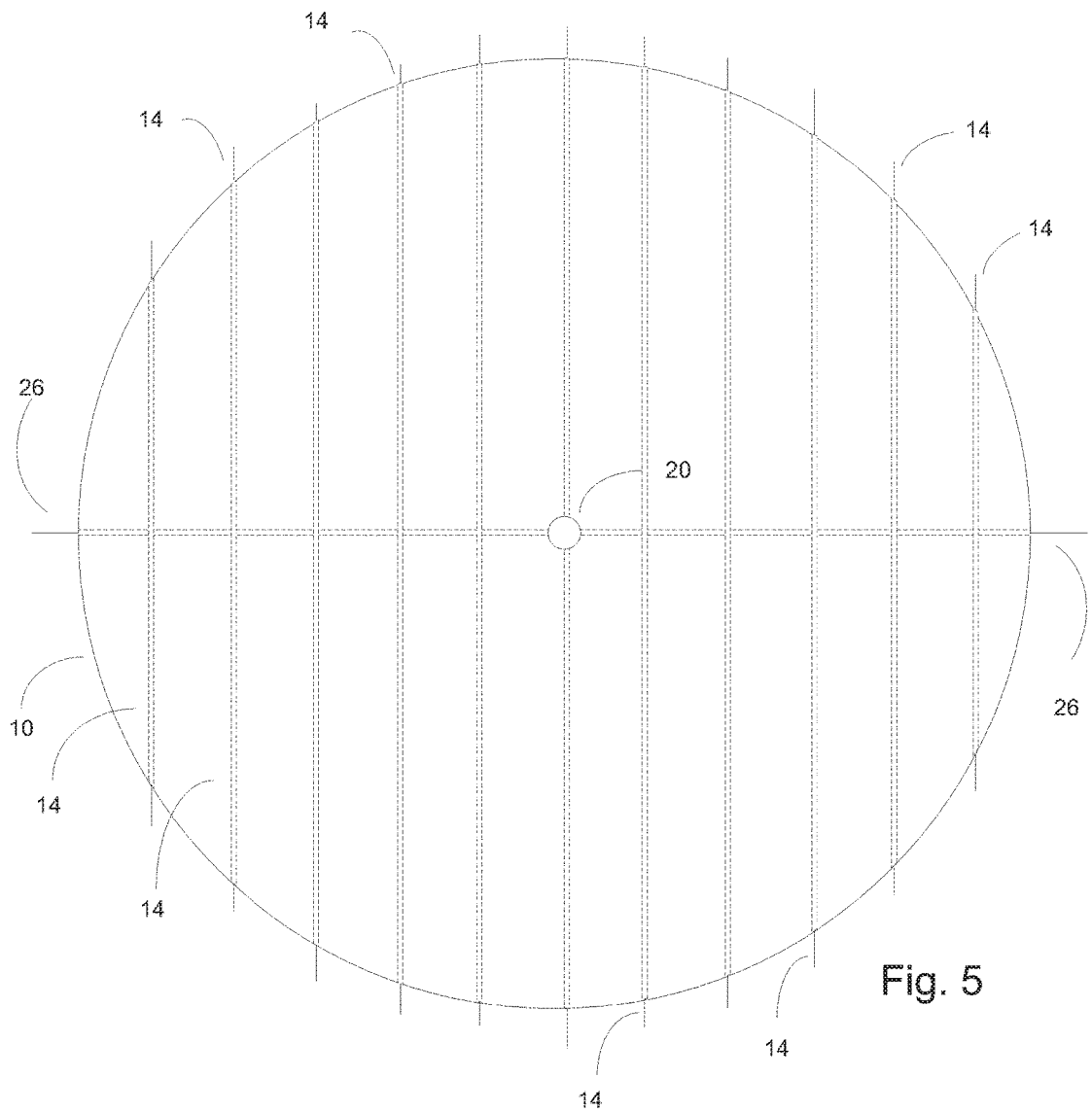
FIG. 5 is a plan view of another embodiment of a round tarpaulin.

Other strap and webbing configurations may be used as circumstances require. FIG. 5 shows an alternative embodiment of the tarpaulin and strap system depicted in FIGS. 1 and 2. In FIG. 5, parallel pockets run across of the tarpaulin and straps 14 are within the pockets. A perpendicular cross-strap 26 provides strength and tensioning ability in a direction that is perpendicular to the parallel straps. A center hole 20 may have a reinforced collar or other device to allow perpendicular strap 26 and one of the parallel straps to meet and connect at the center hole.

Figure 6:
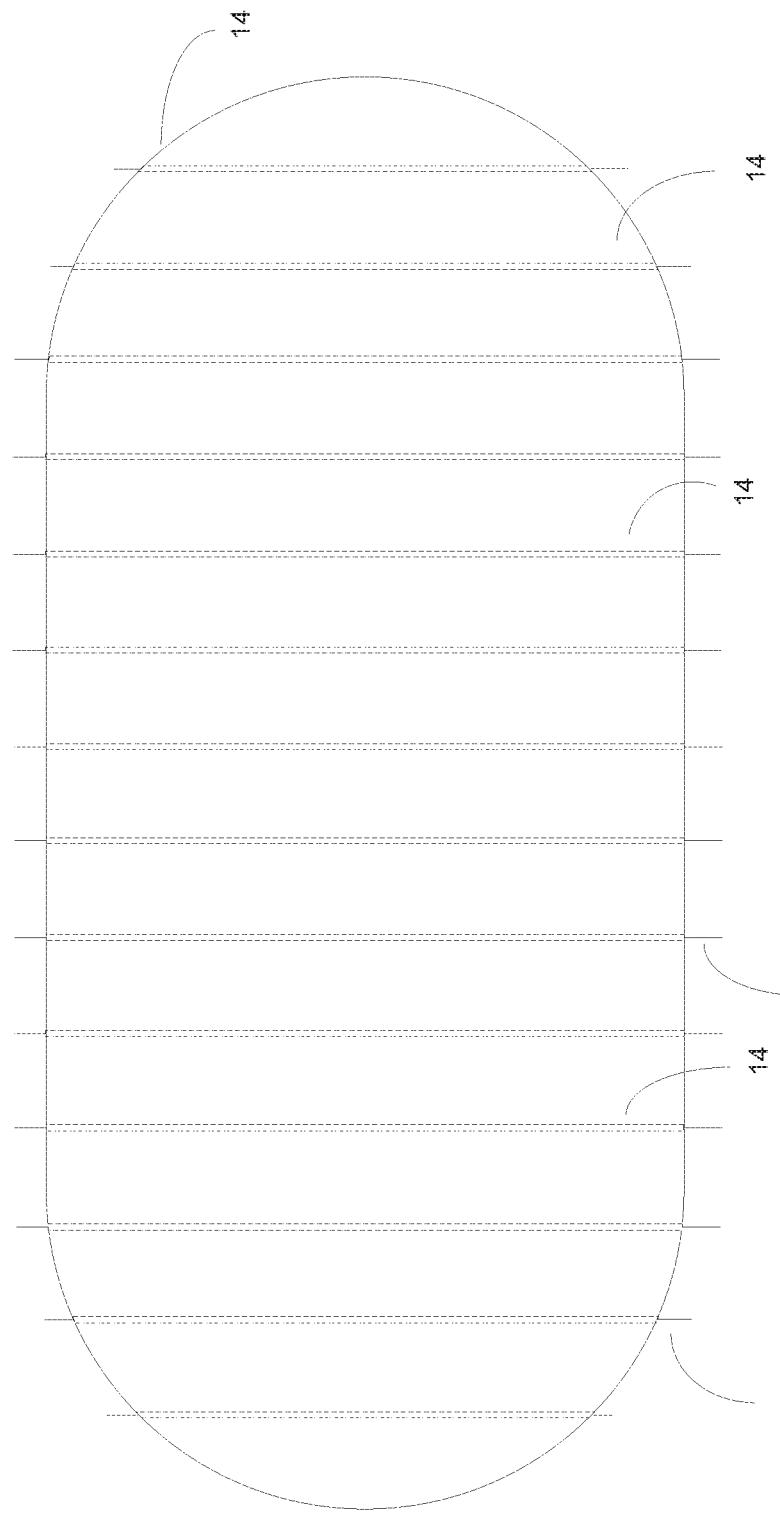
FIG. 6 is a plan view of an embodiment of a tarpaulin in the shape of an oval with straps running crosswise to the longitudinal axis of the oval.

FIG. 6 depicts a plan view of another embodiment of a storage tarpaulin. In this embodiment, pockets and straps 14 run crosswise to the long axis of the oval tarpaulin. This configuration may be suitable for a storage area in which material is to be deposited or removed from either or both ends. As material is added, straps at the vicinity of the area where material is added can be adjusted by loosening until the particulate has been added, or by tightening to secure the tarpaulin against the material. This can be done in a localized area without the need to adjust straps in other parts of the storage area.

Figure 7:
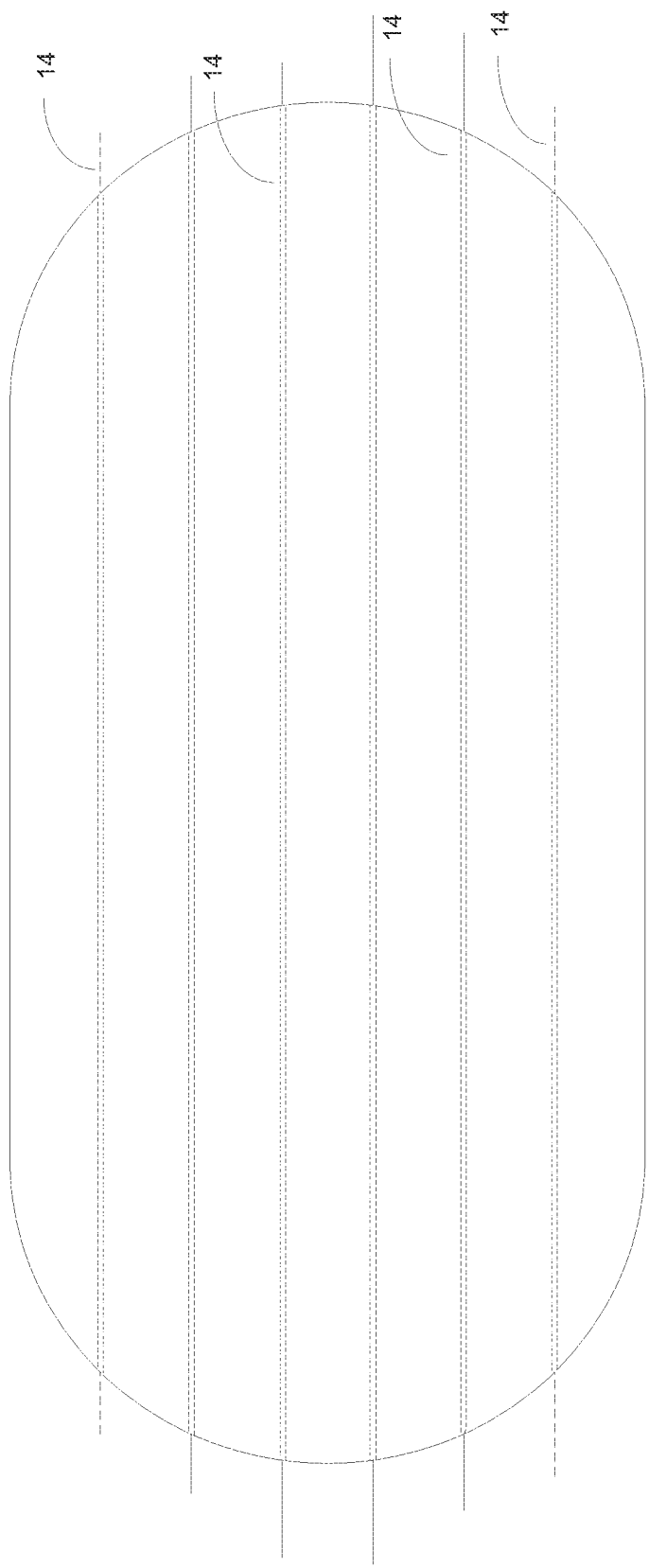
FIG. 7 is a plan view of an embodiment of a tarpaulin in the shape of an oval with straps running parallel to the longitudinal axis of the oval.

Another oval embodiment is shown in the plan view of FIG. 7. In FIG. 7, the pockets run lengthwise on the long axis of the oval tarpaulin. Straps 14 are be used to tension the tarpaulin against the stored material.

Figure 8:
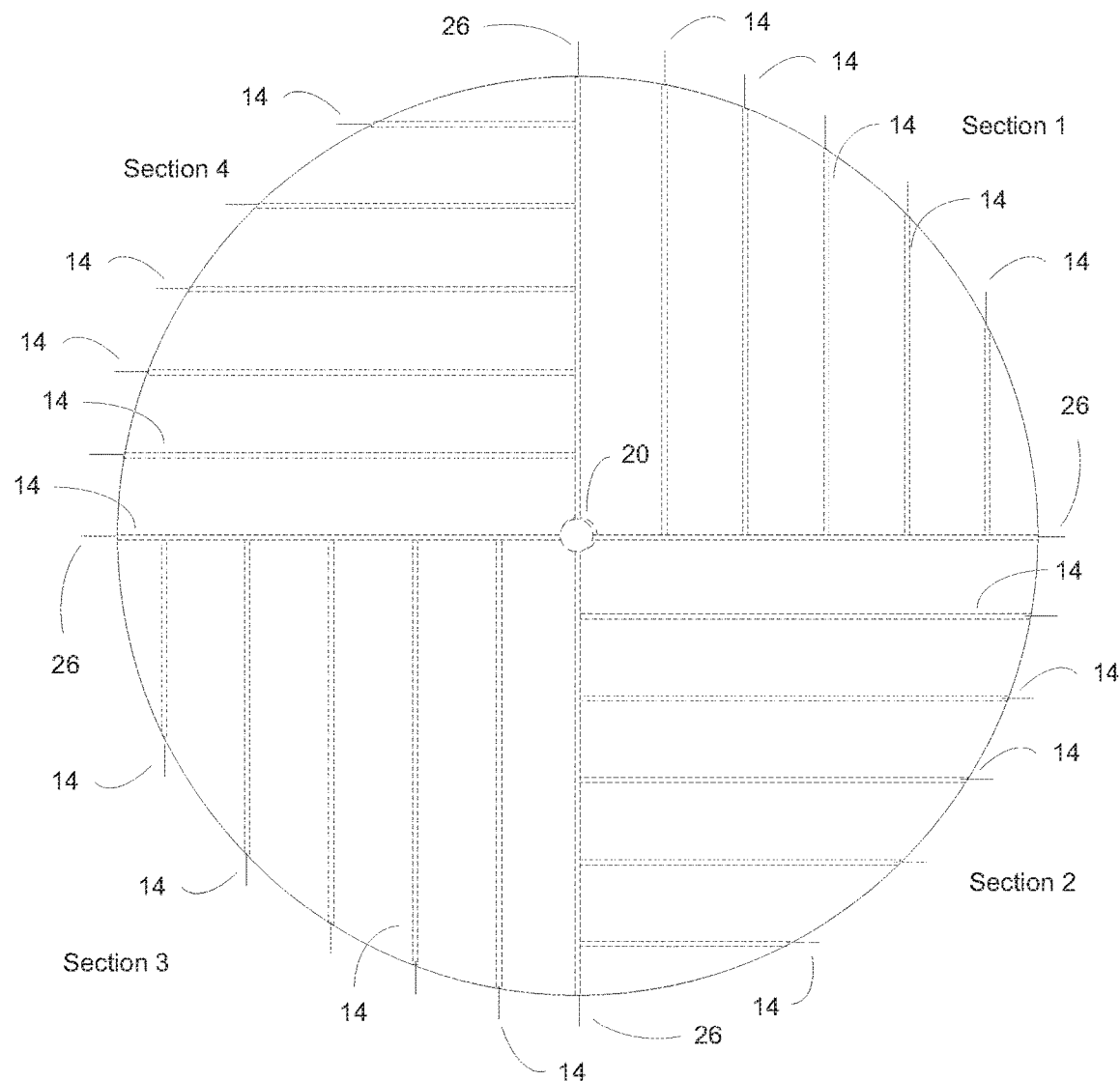
FIG. 8 is a plan view of another embodiment of a round tarpaulin in which the straps terminate at a mid-point in the tarpaulin.

FIG. 8 is a plan view depicting an alternative embodiment of a round tarpaulin that may be assembled in four sections. In this configuration, parallel straps 14 intersect and join perpendicular straps 26. Pockets enclose all straps. In each section, parallel straps extend from the edge of the tarpaulin about half of the distance across the tarpaulin, only as far as a perpendicular strap where they are joined and terminate.

Figure 9:
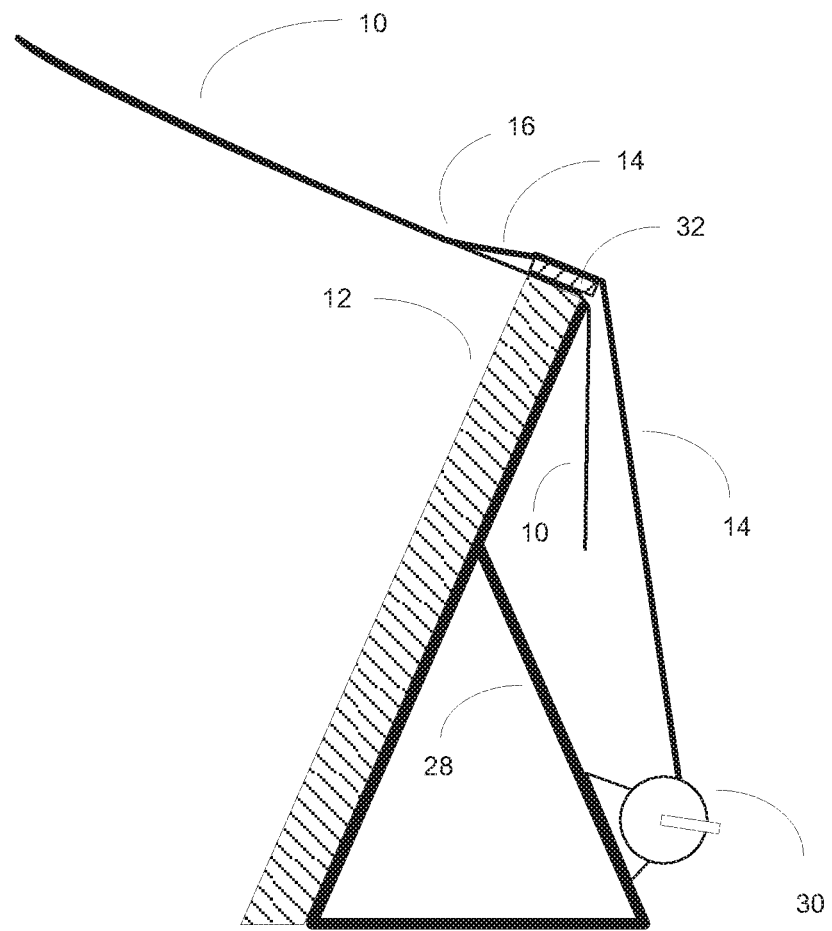
FIG. 9 illustrates a retaining wall and angle iron brace in cross section with a tarpaulin sandwiched between a board and the retaining wall, and a strap attached to a winch.

FIG. 9 depicts the retaining wall 12 (in cross section) and demonstrates how the tarpaulin 10 and strap 14 may be anchored to angle iron brace 28 which is situated adjacent to retaining wall 12. In this embodiment, board 32 runs lengthwise along the top of the retaining wall 12. Just before the tarpaulin reaches the board 32 the strap 14 leaves the tarpaulin through a hole in the pocket 16 and passes over the board 32. The tarpaulin 10 extends between the top of the retaining wall 12 and the board 32, and is pressed between the retaining wall 12 and board 32 when the board is tightened against the retaining wall with screws, clamps, or some other suitable tightening mechanism. Strap 14 runs over the board and terminates at a winch 30, ratchet, or other suitable device that may be used to tension the strap. As depicted in FIG. 9, angle iron brace 28 further supports winch 30. In this embodiment, the winch 30 and supporting angle iron brace 28 are the anchors which tighten and secure tarpaulin 10.

Figure 10:
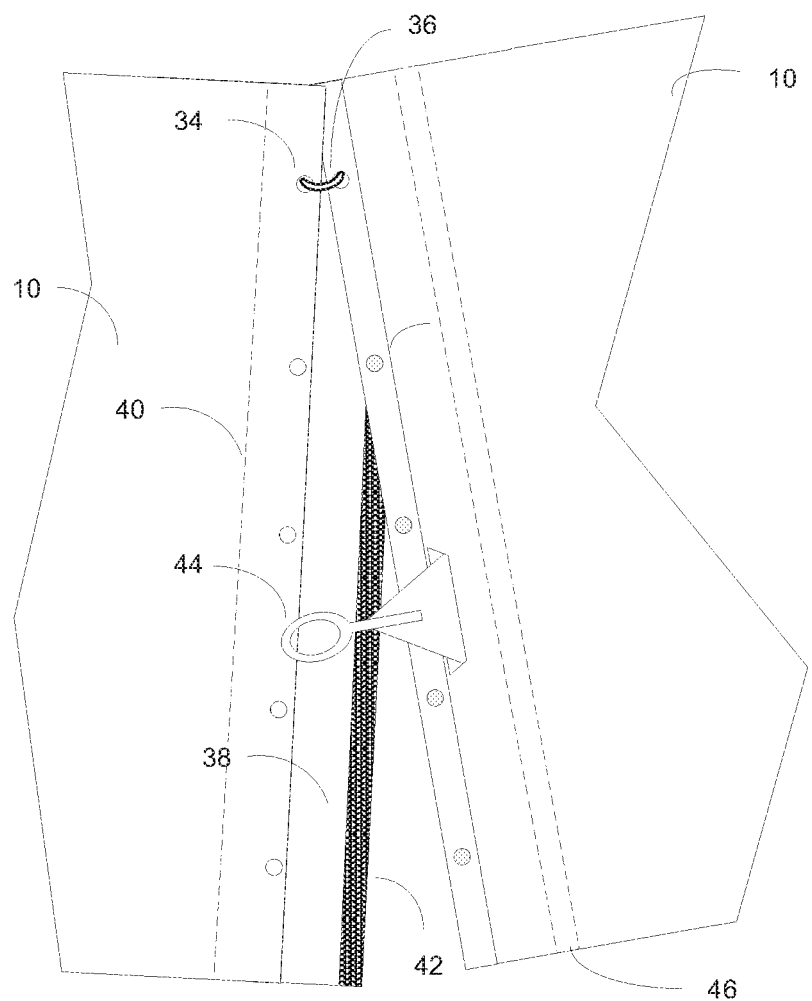
FIG. 10 illustrates a method of connecting two tarpaulin sections.

FIG. 10 depicts a seam between two tarpaulin sections 10, and also shows an integral handle 44 for closing the two sections. A rain flap 38 is used to keep water out of the storage area. The rain flap 38 may be attached to the tarpaulin by stitching 40, or preferably by heat bonding. A hook and loop fastener 42, 46 may be used to seal the rain flap against becoming unsecured by wind or the elements. Where the respective edges of two adjacent sections meet, opposing grommets 34 are used to hold the sections together and are tied with a plastic tie wrap 36, a cord, cable, chain, carabiner or any other suitable closing mechanism.

Figure 11:
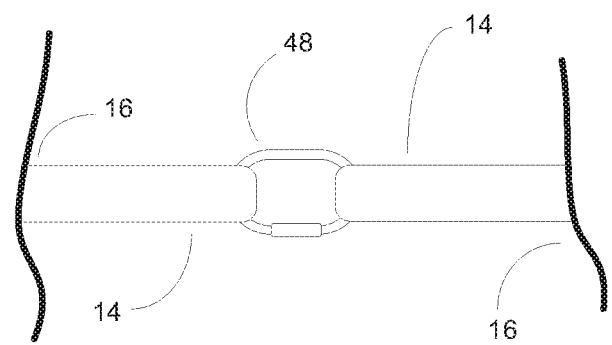
FIG. 11 depicts two straps attached using a carabiner.

At times, it may be necessary to secure two straps 14 to one another. When this is done as shown in FIG. 11, a carabiner 48 may be used to pass through opposing loops in the straps 14. A carabiner may have a quick release or spring loaded link that may be opened to secure or loose the straps. Optionally, straps may have grommets or other reinforcements embedded at the end, and two straps may be connected by a screw or nut and bolt.

Figure 12:
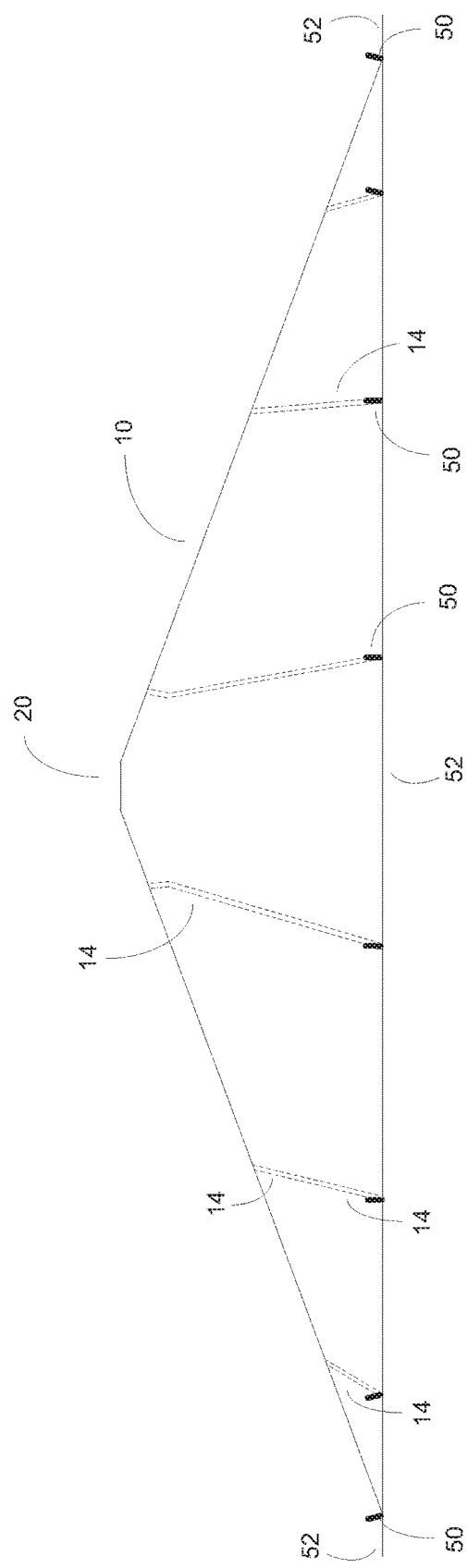
FIG. 12 depicts an embodiment of the storage system in which a retaining wall is not used.

FIG. 12 depicts an embodiment of the storage system in which a retaining wall is not used. Although any suitable ground anchoring component may be used, one of the simplest, which is depicted in FIG. 12, is stakes 50 that may be embedded in the ground or may be embedded in or otherwise secured to a ground covering 52. In an embodiment, the ground covering may be a tarpaulin material that attaches to the tarpaulin 10 around the base perimeter of the storage area, thereby preventing the material being stored from escaping below the tarpaulin 10, or allowing wind or rain to enter the storage area from beneath the tarpaulin 10.

In yet another embodiment of the present invention, the tarpaulin engages a ground covering section. The ground covering section is laid on the ground, whereupon particulate material is piled on top of the ground covering. Once the particulate material has been piled on the ground covering, the perimeter of the tarpaulin is secured to the perimeter of the ground covering using a hook and loop fastener, or by sewing the perimeters together, or by using any other equivalent structure for securing the perimeter of the tarpaulin to the perimeter of the ground covering. Once the tarpaulin and ground covering have been secured to one another, an internal strapping system—as described herein—may then be utilized to tighten and further secure the ground covering and tarpaulin to the particulate material contained therein.

The invention claimed is:

1. A storage system for covering a pile of bulk material, the system comprising:
    a storage area surface having a storage perimeter defined at a ground surface within which the pile of bulk material is deposited;
    a retaining wall extending along the storage perimeter;
    a tarpaulin including:
        at least one perimeter edge defining at least a portion of a tarpaulin perimeter, a portion of the at least one perimeter edge extending over at least a portion of the retaining wall;
        at least one tunnel integrally bonded to the tarpaulin; and
        a strap provided within the tunnel, at least one end of the strap extendable beyond at least a portion of the retaining wall; and
    a board wherein the board is secured to the retaining wall so that a portion of the tarpaulin is located between the board and the retaining wall.

2. The storage system of claim 1, wherein the retaining wall is angled away from the storage area surface.

3. The storage system of claim 2, further comprising a brace situated adjacent to an outer surface of the retaining wall, the outer surface on an opposite side of the retaining wall as the storage area surface.

4. The storage system of claim 3, further comprising a tightening mechanism attached to the brace and connected to the at least one end of the strap.

5. The storage system of claim 4, wherein the tightening mechanism is a winch.

6. The storage system of claim 1, wherein the retaining wall is substantially planar.

7. The storage system of claim 1, wherein the retaining wall is at least 6 feet in height.

8. The storage system of claim 1, further comprising a tightening mechanism connected to the at least one end of the strap.

9. The storage system of claim 8, wherein the tightening mechanism comprises a winch.

10. The storage system of claim 8, wherein the at least one end of the strap is extendable over the board and the tightening mechanism increases tension on the strap thereby pressing the secured board against the retaining wall.

11. The storage system of claim 1, wherein the strap is freely movable through the tunnel.

12. The storage system of claim 1, wherein the board is secured to the retaining wall by screwing the board directly onto the retaining wall.

* * * * *